United States Patent [19]
Roberts

[11] Patent Number: 4,539,164
[45] Date of Patent: Sep. 3, 1985

[54] METHOD FOR FABRICATING A SUPPORT FOR A BUBBLE CAP ON THE END OF ITS RISER TUBE

[75] Inventor: Wayne L. Roberts, Tulsa, Okla.

[73] Assignee: Combustion Engineering, Inc., Windsor, Conn.

[21] Appl. No.: 598,128

[22] Filed: Apr. 9, 1984

[51] Int. Cl.³ .............................................. B01F 3/04
[52] U.S. Cl. ................... 261/114 A; 72/326; 29/157 R
[58] Field of Search ............... 261/114 A; 72/326; 29/455 R, 157 R

[56] References Cited

U.S. PATENT DOCUMENTS

| | | | |
|---|---|---|---|
| 493,791 | 3/1893 | Schurig | 72/326 |
| 1,482,408 | 2/1924 | Piron | 261/114 A |
| 1,773,522 | 8/1930 | Delery | 72/326 |
| 2,060,601 | 11/1936 | Wentworth | 261/114 A |
| 2,438,536 | 3/1948 | Cairns | 261/114 A |
| 2,578,881 | 12/1951 | Dunn | 261/114 A |
| 2,602,652 | 7/1952 | Haynes | 261/114 A |
| 4,146,950 | 4/1979 | Powers | 261/114 A |

FOREIGN PATENT DOCUMENTS 507475  12/1951  Belgium ........................ 261/114 A

*Primary Examiner*—Tim Miles
*Attorney, Agent, or Firm*—Arthur L. Wade

[57] ABSTRACT

A spider is formed at the upper end of a vapor riser tube by shearing and upsetting or crimping a portion of the upper end to form a support for a bolt which mounts the bubble cap.

1 Claim, 5 Drawing Figures

Fig. 3
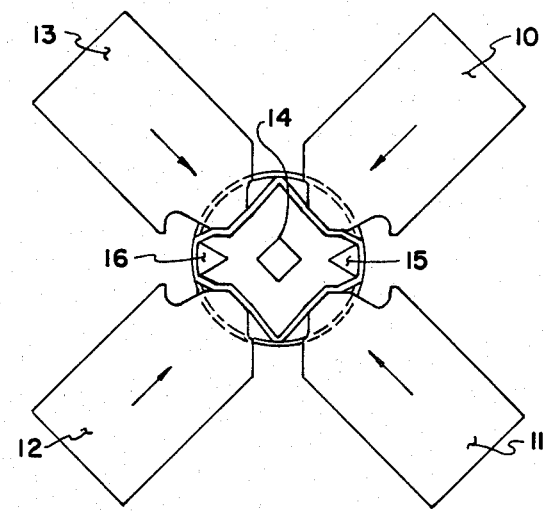
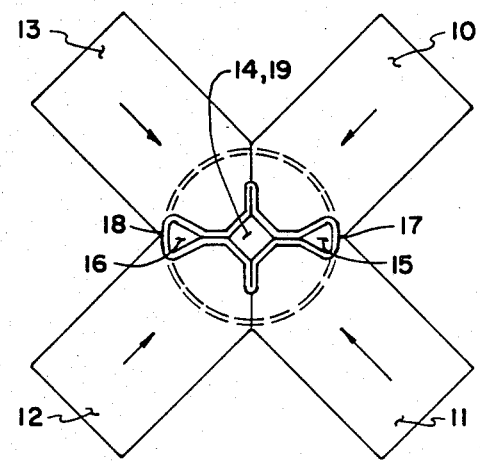
Fig. 4

METHOD FOR FABRICATING A SUPPORT FOR A BUBBLE CAP ON THE END OF ITS RISER TUBE

TECHNICAL FIELD

The present invention relates to the support for the bubble cap of a riser tube. More particularly, the invention relates to using a portion of the upper end of a riser tube to form a spider for a bolt support between the riser tube and bubble cap.

BACKGROUND ART

The name of the game is desired contact between a gas or vapor and a liquid. Basically, an arrangement is provided to release the vapor or gas beneath the surface of the treating liquid to ensure desired contact between the mediums.

A wide variety of shapes and arrangements have been developed for bubble caps in the prior art. All the configurations have at least one thing in common: they bring the vapor into intimate contact with the liquid on a tray. A plurality of trays, vertically stacked within a tower, establish a predetermined number of contacts between the vapor and the liquid. Each tray has an upstanding lip at its periphery below which the level of the treating liquid is held. The number of bubble caps needed to secure the desired contact between the vapor and liquid is calculated. Fundamentally, one or more riser tubes are mounted through the bottom of a tray, the treating liuqid is held on the tray at a predetermined depth, and the vapor to be treated is flowed up the riser tube and diverted downwardly by a telescoping cap which forces the vapor below the surface of the liquid on the tray where it is released to bubble up through the liquid. If the present support for the bubble cap at the top of the riser tube can be simplified, significant savings can be realized.

At present, the bubble caps are secured to the top of the riser tubes with a spider structure made up of several pieces welded to form a support for a central bolt. The cap is then captured on the upper end of this supported bolt to form an annular space between the inside of the cap and the outside of the riser tube. This spider of several pieces welded together is the structure which can be greatly simplified in pursuit of lower manufacturing costs.

DISCLOSURE OF THE INVENTION

The present invention contemplates providing a die having a jaw with a cutting edge and a spider-forming face. As the jaw advances upon the upper edge of the riser tube, the cutting edge shears a portion of the upper edge of the riser tube. Further advance of the jaw brings the face into contact with the sheared portion of the riser tube and upsets or crimps the sheared portion around the axis of the riser to form a spider of satisfactory strength as a support for a bolt to which the riser bubble cap can be mounted.

Other objects, advantages and features of this invention will become apparent to one skilled in the art upon consideration of the written specification, appended claims, and attached drawings.

BRIEF DESIGNATION OF THE DRAWINGS

FIG. 3 is a plan view of the riser tube with the shearing portion of the jaws in the process of cutting the required distance below the top of the riser tube;

FIG. 4 is a plan view showing the vapor riser tube deformed by the jaws to complete the bolt-supporting spider.

BEST MODE FOR CARRYING OUT THE INVENTION

Figure 1:
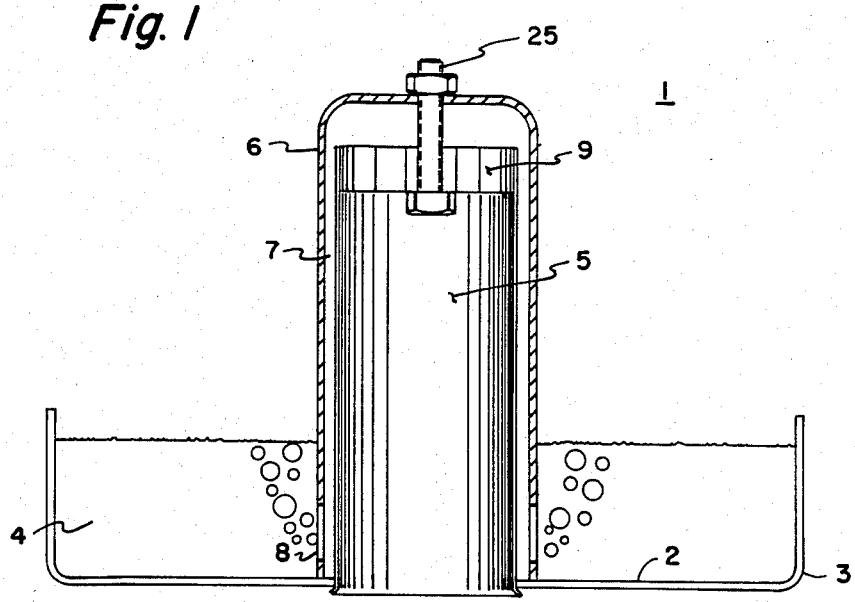
FIG. 1 is a sectioned plan view of a vapor riser tube and bubble cap embodying the present invention.

In FIG. 1 the complete bubble cap assembly 1 is shown as mounted on the top surface 2 of a tray 3. A quantity of treating liquid 4 is disclosed as retained on tray 3 below the upper end of the lip of the tray. As vapor flows up a cylindrical riser tube 5 of bubble cap assembly 1 it is diverted downwardly by cap 6 mounted to form an annular space 7. The vapor is forced to follow the downward path between the inside of the cap and the outside of the riser tube until released into the liquid 4 through openings 8 in the lower end of the cap. Having contacted the liquid, the vapor then bubbles up and is released at the surface of the liquid. A second contact may be made with another tray located above tray 3.

Figure 2:
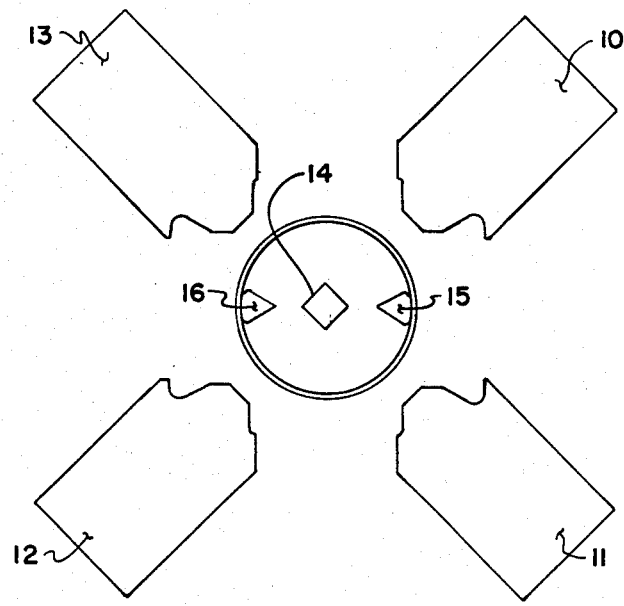
FIG. 2 is a plan view of the vapor riser tube with the shearing and crimping jaws being brought to bear upon the upper portion of the riser tube.

The present invention is concerned with the fabrication of a support spider 9 from the upper end of the riser tube. Spider 9 is formed from the upper wall of the riser tube and no welding is necessary. In a series of steps illustrated in FIGS. 2, 3 and 4, the spider is progressively formed by shearing jaws 10, 11, 12, 13 which have both shearing edges and a deforming face. FIGS. 2, 3 and 4 disclose the progressive fabrication of support spider 9 from the upper end of riser tube 5. FIG. 2 discloses how the shearing jaws are positioned about the riser tube. The massive structure which supports and advances the jaws toward the riser tube need not be disclosed. Such disclosure of the mechanism powered to move the jaws of the die would needlessly encumber the disclosure of the drawings. Given a motive means linked to the jaws is accepted as a well-understood arrangement in the art.

Figure 5:
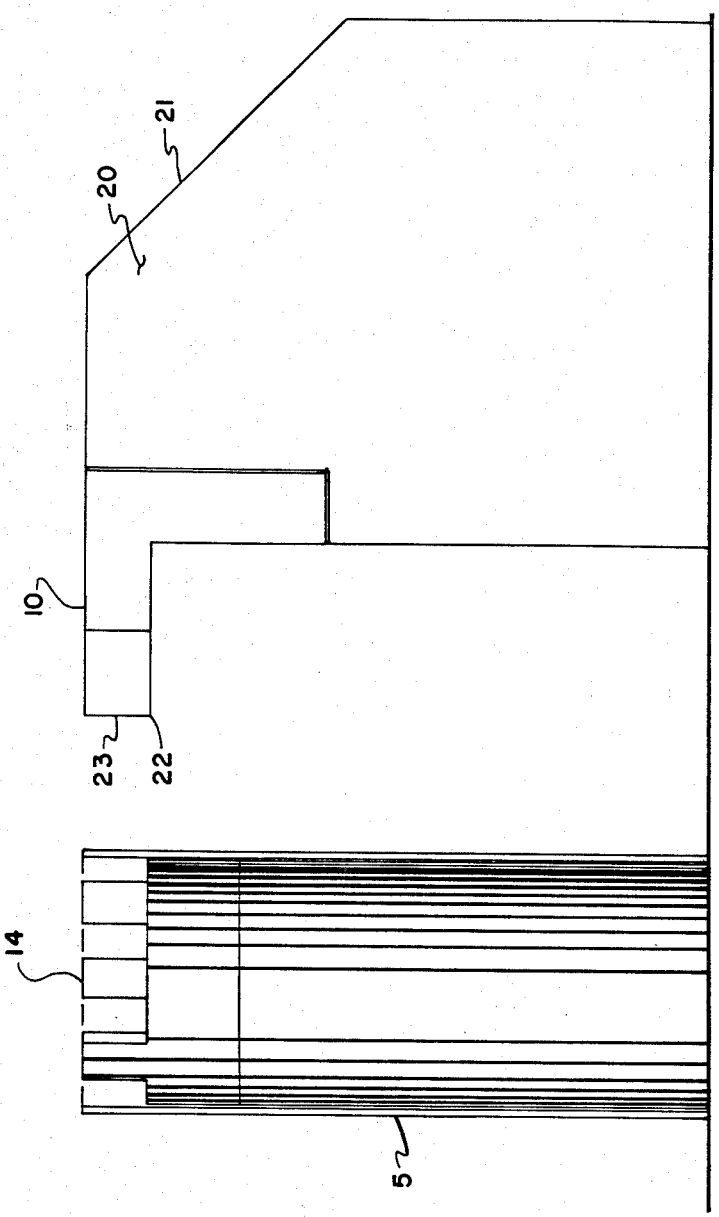
FIG. 5 is a side elevation disclosing one of the jaws mounted on the die positioned to advance toward the riser tube.

In FIG. 2, a forming post 14 is extended upward through the riser tube along the axis to assure the correct shape and size of a hole to receive a fastening means in the form of a bolt which mounts cap 6. Additionally, forming posts 15 and 16 extend up through the riser tube to assure the correct shape of the unsheared portions of the upper wall of the riser tube. Again, FIG. 2 discloses the direction the jaws are given to shear and form a spider with the upper wall of the riser tube. The cutting edge of each jaw cannot be viewed in FIGS. 2, 3 and 4. FIG. 5 provides disclosure of the location of the shearing edge of each jaw. It is the cutting edges of the jaws which shear through the wall of the riser tube and crimp or upset the wall material into the final shape required for spider 9.

FIG. 3 is provided to give progression of the jaws as they work the material of the upper wall of the riser tube. In FIG. 3, jaws 10, 11, 12 and 13 have been moved inward to shear through the wall of the riser tube. Thus, the jaws are shearing, deforming, upsetting, or crimping the material of the wall to form the spider.

FIG. 4 discloses the jaws advanced completely. The forward face of each jaw is brought to bear against the deformed material about forming post 14. The parts of the riser wall remaining at 17 and 18 are preserved and referred to as tabs. Thus 17 and 18 form the link between spider 9 and the riser tube wall. The wall material sheared and deformed by the jaws extends between tabs 17 and 18. The spider is complete with the central bolt hole 19 in which forming post 14 extends.

It does not appear necessary to have all the parts disclosed to which the jaws are attached; however, FIG. 5 does illustrate how riser tube 5 is mounted to slide down and over the forming posts 14, 15 and 16 and held firmly in the FIG. 5 position. Jaws 10, 11, 12 and 13 are placed around the upper portion of the riser tube. FIG. 5 discloses jaw 10 mounted on master slide 20. The master slide is moved by a force applied to inclined surface 21. As viewed in FIG. 5, the movement from the position shown is to the left in order to bring shearing edge 22 against the upper wall of the riser tube. The shearing edge and deforming face 23 of the jaw is moved into the riser tube to shear the wall and simultaneously upset or crimp the sheared portion of the riser tube wall toward the central forming post 14.

The other three jaws are brought into the riser tube to duplicate the work of jaw 10, completing the spider extending between tabs 17 and 18. The completed crimping operation on riser tube 5 is followed by withdrawing the jaws to the FIG. 2 position, and riser tube 5 is ejected upward and out of the die as an article of manufacture.

Conclusion

The disclosure is now complete and should be readily understood by one skilled in the art. In one sense, the invention is embodied in riser tube 5 with the disclosure of spider 9. Hole 19 is axially aligned with the riser tube axis. A bolt 25 (appearing only in FIG. 1) is mounted through hole 19 and cap 6 has a central hole through which bolt 25 extends. A suitable nut threads down bolt 25 to capture cap 6 in the FIG. 1 position. On the other hand the sequential steps of mounting the riser tube on the die and moving the jaws from the FIG. 2 position to the FIG. 4 position can be defined as a method by which the upper part of the riser tube is worked to form spider 9. As a final note, it is emphasized that no time-consuming welding operation is necessary. No parts need be mounted by welding to create a spider.

From the foregoing, it will be seen that this invention is one well adapted to attain all the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. The method of forming a bubble cap assembly comprising a cylindrical riser tube supporting a bubble cap on its upper end, including,
   moving four metal shearing and forming jaws in a horizontal plane toward the upper portion of the riser tube,
   advancing the jaws simultaneously into the side of the riser tube to first horizontally shear a portion of the upper end of the riser tube and deforming the sheared sides of the tube inwardly until the sheared material of the riser tube wall extends over the central axis of the tube to form a spider with an aperture coinciding with the axis of the riser tube, and
   extending a bolt through the aperture formed in the spider as a link between the bubble cap and riser tube.

* * * * *